(12) United States Patent
Nakamura et al.

(10) Patent No.: US 9,664,984 B2
(45) Date of Patent: May 30, 2017

(54) OPTICAL UNIT, PROJECTION DISPLAY APPARATUS, IMAGING APPARATUS

(71) Applicant: HITACHI-LG DATA STORAGE, INC., Tokyo (JP)

(72) Inventors: Toshiteru Nakamura, Tokyo (JP); Satoshi Ouchi, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 67 days.

(21) Appl. No.: 14/556,367

(22) Filed: Dec. 1, 2014

(65) Prior Publication Data

US 2015/0153633 A1 Jun. 4, 2015

(30) Foreign Application Priority Data

Dec. 4, 2013 (JP) ................... 2013-251042

(51) Int. Cl.
*G03B 21/00* (2006.01)
*H04N 5/74* (2006.01)
*H04N 9/31* (2006.01)
*G03B 21/20* (2006.01)
*G03B 21/28* (2006.01)

(52) U.S. Cl.
CPC ......... *G03B 21/008* (2013.01); *H04N 5/7458* (2013.01); *H04N 9/315* (2013.01); *G03B 21/208* (2013.01); *G03B 21/2013* (2013.01); *G03B 21/2033* (2013.01); *G03B 21/28* (2013.01)

(58) Field of Classification Search
CPC .. G03B 21/008; G03B 21/2033; G03B 21/28; G03B 21/2013; G03B 21/208; H04N 9/315; H04N 5/7458

USPC ... 348/68, 131–132, 136, 224.1, 333.1, 369, 348/602, 744, 771, E5.029, E13.035
See application file for complete search history.

(56) References Cited

U.S. PATENT DOCUMENTS

| | | | | |
|---|---|---|---|---|
| 7,258,451 B2* | 8/2007 | Wang | ................. | G02B 27/0994 348/759 |
| 8,773,529 B2* | 7/2014 | Kießhauer | ............. | G03B 21/53 348/135 |
| 2003/0202259 A1* | 10/2003 | Nishimae | ............. | G02B 26/008 359/726 |
| 2005/0200817 A1* | 9/2005 | Kim | ................... | G03B 21/2053 353/97 |

(Continued)

FOREIGN PATENT DOCUMENTS

JP       2004-240050 A    8/2004

*Primary Examiner* — Hung Lam
(74) *Attorney, Agent, or Firm* — Mattingly & Malur, PC

(57) ABSTRACT

In an optical unit having a reflective picture display device for displaying pictures by projecting light, the picture display device has a first state in which focused light is reflected in an optical axis equivalent direction of an image to be displayed and a second state in which focused light is reflected so as to have a component in a vertical equivalent direction of an image to be projected, a plane including an entire optical axis of light reflected in the second state differs from a plane formed by the optical axis of light incident on the picture display device and the optical axis of light reflected by the picture display device in the first state, and the opening size of the opening of an illumination lens in a horizontal equivalent direction of the image to be projected is larger than in the vertical equivalent direction.

7 Claims, 12 Drawing Sheets

(56) References Cited

U.S. PATENT DOCUMENTS

| | | | |
|---|---|---|---|
| 2006/0140511 A1* | 6/2006 | Chang ................. | H04N 5/7458 |
| | | | 382/298 |
| 2012/0147334 A1* | 6/2012 | Mizushima .......... | G02B 13/007 |
| | | | 353/31 |
| 2013/0250249 A1* | 9/2013 | Cheng ................. | G03B 21/208 |
| | | | 353/37 |

* cited by examiner

OPTICAL UNIT, PROJECTION DISPLAY APPARATUS, IMAGING APPARATUS

CROSS-REFERENCE TO RELATED APPLICATION

This application claims the priority of Japanese Patent Application No. 2013-251042 Filed Dec. 4, 2013, which is incorporated herein by reference in its entirety.

BACKGROUND OF THE INVENTION

1. Field of the Invention

The present invention relates to an optical unit projecting a picture on a screen using a light source and picture display device and to a projection display apparatus and an imaging apparatus that have the optical unit.

2. Description of the Related Art

In a projection display apparatus (that is, a projector), a DMD (Digital Micromirror Device), which is one of micromirror picture display devices, is attracting attention as a picture display device capable of achieving a small and high luminance optical unit. The DMD performs optical modulation by individually controlling the angle of a micromirror provided for each pixel to divide DMD incident light into a direction (ON light) in which the light is incident on a projection lens and a direction (OFF light) in which the light is not incident on the projection lens.

In an optical system including an optical unit using the DMD, the main optical axis of incident light needs to be slanted at a predetermined amount with respect to the surface normal of the DMD so that the main optical axis of DMD reflected light is not aligned with the main optical axis of DMD incident light. When the rotational angle is slanted at +θ when the DMD is on or at −θ when the DMD is off, the DMD incident light is generally slanted at 2θ with respect to the center optical axis (surface normal) of the DMD. In addition, the spread angle is generally limited to an angle equivalent to θ or less by increasing the F-number of an illumination light beam incident on the DMD mirror (that is, by suppressing the spread of the illumination light beam) to prevent the contrast from being reduced by an overlap among an ON light beam, an OFF light beam, and flat light beam, which is a reflected light beam reflected by the surface of the cover glass covering the mirror device.

SUMMARY OF THE INVENTION

A conventional projection display apparatus is configured using a picture display apparatus including a micromirror as described in JP-A-2004-240050. The reflected light ray vector roff of reflected light when the micromirror of this picture display apparatus is off is present on a plane formed by a screen horizontal equivalent direction and the reflected light ray vector ron of the reflected light when the micromirror is on.

One method for achieving high luminance is to reduce the F-number of an illumination light beam. However, reducing the F-number causes an overlap between an OFF light beam and an ON light beam, thereby reducing the contrast. Accordingly, a conventional method needs to increase the opening diameter by reducing the F-number only in a screen vertical equivalent direction. Since this direction is equivalent to the vertical direction (that is, the thickness direction) in a conventional apparatus, the light beam diameter in the thickness direction of the apparatus increases and the thickness of the optical component increases, thereby making it difficult to reduce the thickness of the apparatus.

The invention addresses this problem, with an object of providing a thin and high luminance projector optical unit, a projection display apparatus having the projector optical unit, and an imaging apparatus having the projector optical unit by improving the efficiency while reducing the thickness of the illumination optical system.

The above object is achieved by, for example, the structure designated in the appended claims.

The invention has an effect of providing a thin and high luminance projector optical unit, a projection display apparatus having the projector optical unit, and an imaging apparatus having the projector optical unit.

DESCRIPTION OF THE PREFERRED EMBODIMENT

Figure 1:
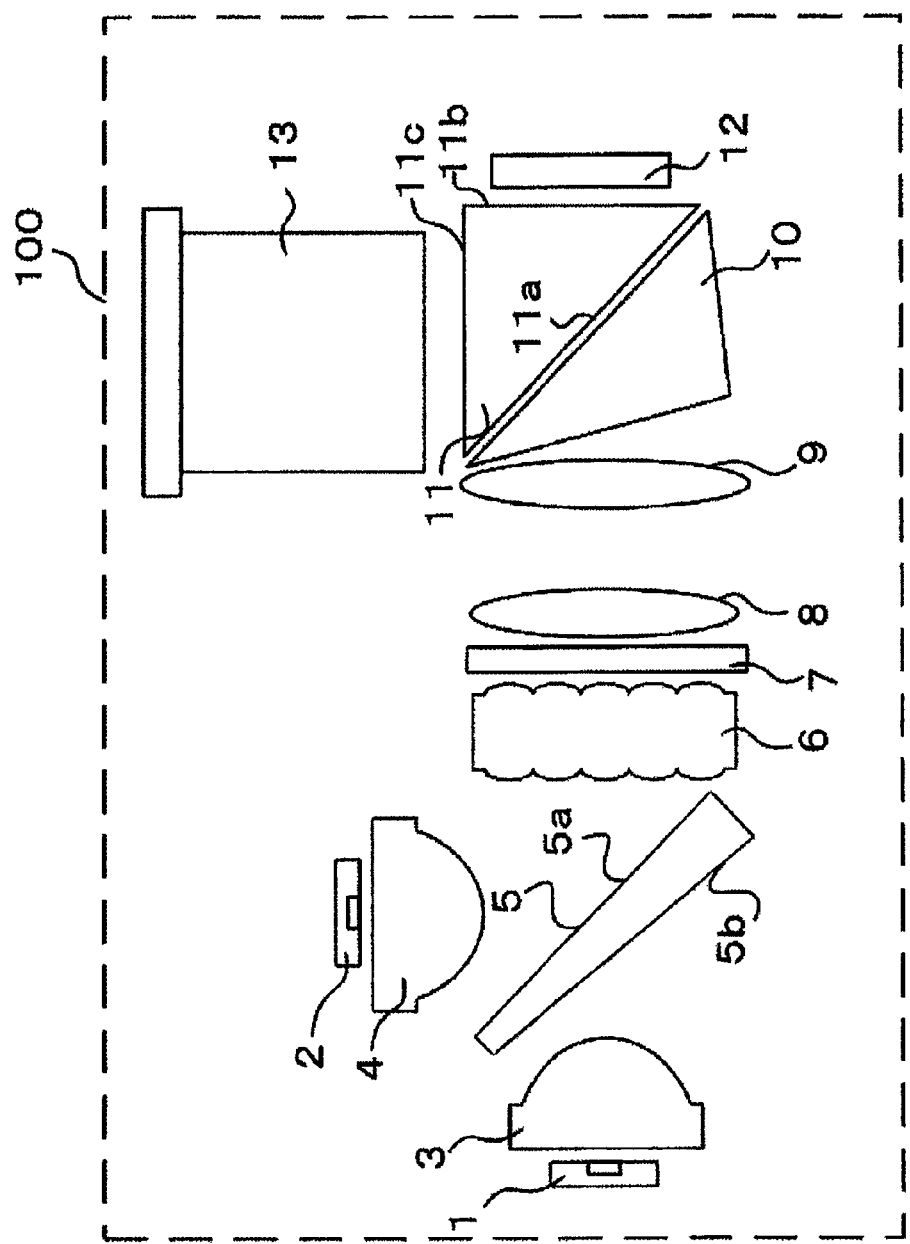
FIG. 1 is a block diagram showing an optical unit in the present embodiment.

Examples of embodiments of an optical unit according to the present invention and a projection display apparatus and an imaging apparatus that have the optical unit will be described with reference to the drawings. The invention is not limited by the following description. In the drawings, components with the same functions are denoted by the same reference characters.

FIG. 1 is a block diagram showing an optical unit 100 in the embodiment.

The optical unit 100 has light sources 1 and 2, each of which emits a light beam of a predetermined wavelength or waveband.

The light source 1 is, for example, an LED light source that emits a green light beam with a center wavelength of approximately 525 nm. The light source 2 is, for example, an LED light source having a two-color light-emitting source that emits a red light beam with center wavelength of approximately 615 nm and a blue light beam with a center wavelength of approximately 460 nm. The center wavelengths are not limited to these values. Light obtained by using a phosphor to perform wavelength conversion or the like of light emitted from an LED chip may be used.

The light beams emitted from the light sources 1 and 2 are converted by condenser lens 3 and 4 into substantially parallel light beams and then incident on the wedge prism 5 through different directions.

The wedge prism 5 includes, for example, a wavelength selective mirror surface 5a having a function of reflecting a red light beam and passing a blue light beam and a green light beam and a wavelength selective mirror surface 5b having a function of reflecting a blue light beam and passing a red light beam and a green light beam. The wedge prism 5 has a function of combining the light beams of three colors incident on the wedge prism 5.

The combined light beam passes through a lens array 6, an aperture 7, which is an opening determining the F-number of an illumination light beam, and relay lenses 8 and 9 and then enters a correction prism 10. The lens array 6 has, on each of incident and exiting sides, a lens array in which a plurality of lenses are arranged in a plane direction. These optical devices allow a function of generating telecentric and uniform illumination light including light parallel to the optical axis and propagating the light at a desired angle, but detailed descriptions are omitted since this is a related art technique. The relay lenses may be referred to below as illumination lenses.

The light beam that has passed through the relay lens 9 passes through the correction prism 10, passes through an oblique surface 11a and a surface 11b of a total internal reflection prism 11, and irradiates a DMD 12, which is a picture display device. The correction prism 10 has a function of correcting optical path differences caused by the total internal reflection prism 11 and minimizing the optical path length differences of light beams that enter individual positions on a DMD panel.

As described above, the illumination optical system including the components from the lens array 6 to the total internal reflection prism 11 allows the DMD 12 to form an image with uniform illumination. The optical system for forming and propagating predetermined illumination light is not limited to the structure including the lens array 6 and the relay lenses 8 and 9 shown in FIG. 1 and may have another optical system structure.

The light beam reflected by a micromirror plane of the DMD 12 changes its angle, passes through the surface 11b of the total internal reflection prism again, and totally reflected by the oblique surface 11a. The light beam totally reflected by the oblique surface 11a passes through a surface 11c and projects an enlarged picture on a screen (not shown) through a projection lens (projection optical device) 13.

The invention can reduce the thickness, improve the efficiency, and achieve high luminance of the optical unit by causing the direction of the light ray reflected by the micromirror and the aperture shape of the illumination optical system to satisfy a predetermined relational expression.

Figure 2A:
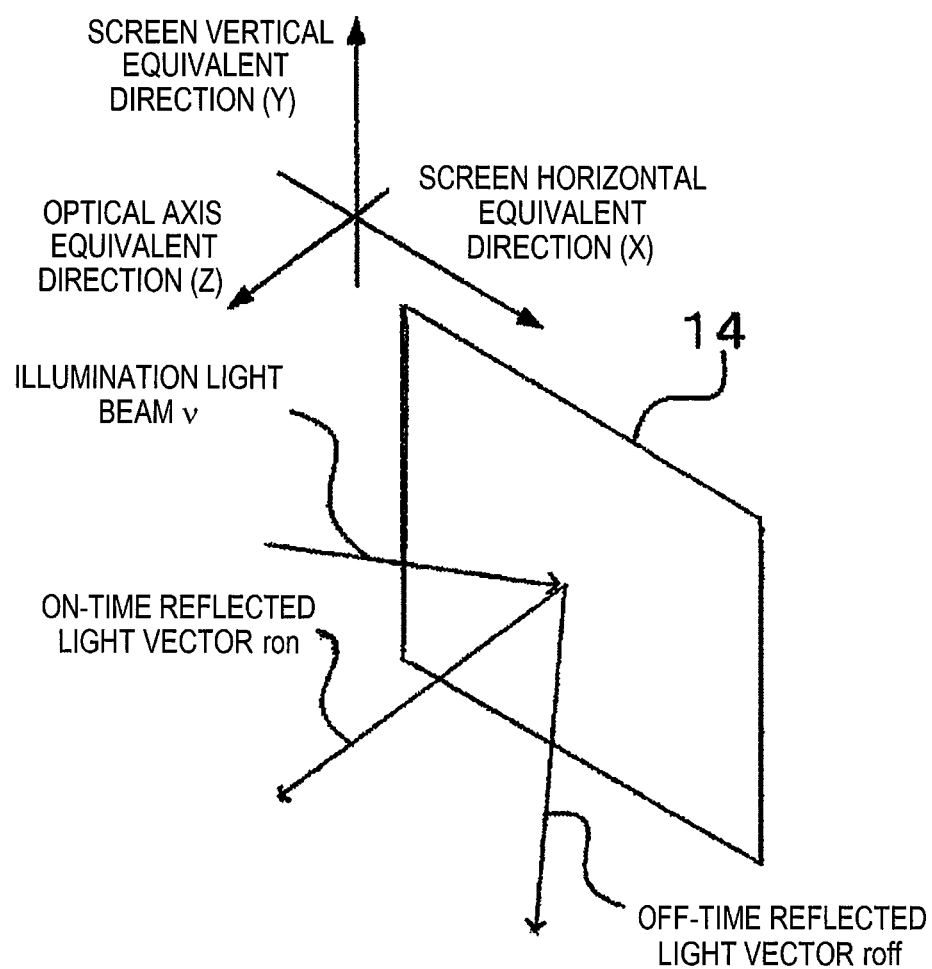
FIG. 2A shows the arrangement of incident light and reflected light for a micromirror in the embodiment.

FIG. 2A shows the arrangement of incident light and reflected light for the micromirror 14 in the embodiment. Specifically, FIG. 2A shows the geometric arrangement of the micromirror 14 of the DMD 12, incident light, a reflected light vector ron (or vector indicating the optical axis direction of reflected light when the micromirror is on) when the micromirror is on, a reflected light vector roff (or vector indicating the optical axis direction of reflected light when the micromirror is off) when the micromirror is off. As shown in the drawing, the coordinate axes in a screen optical axis equivalent direction (Z), a screen horizontal equivalent direction (X), and a screen vertical equivalent direction (Y) in the micromirror 14 are defined.

Figure 2B:
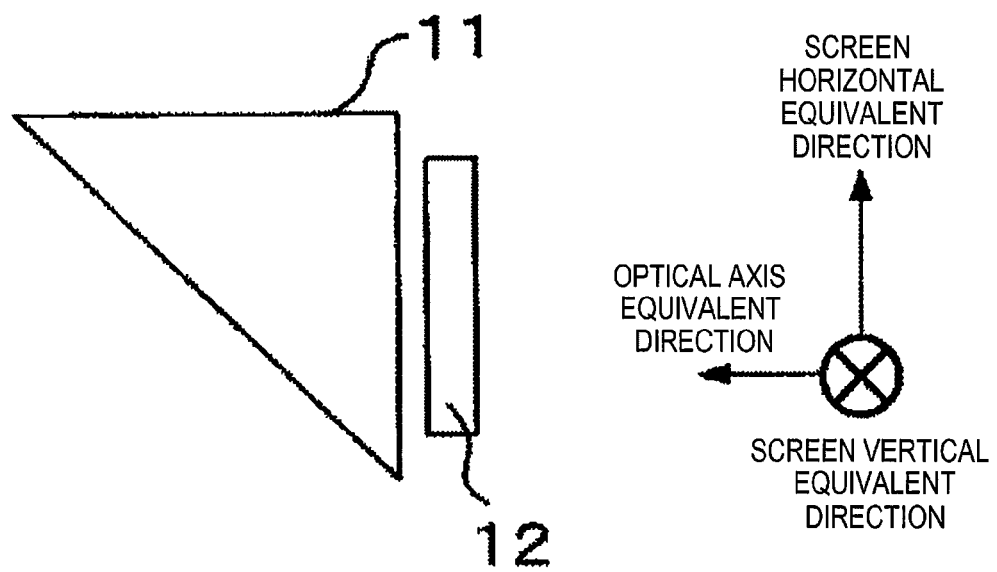
FIG. 2B shows a DMD, a total internal reflection prism, and coordinate axes in the embodiment.

FIG. 2B shows a DMD 12, a total internal reflection prism 11, and coordinate axes to clarify the relationship between the coordinate axes.

The incident light ray vector v indicated as ILLUMINATION LIGHT BEAM in FIG. 2A is assumed to be represented as expression (1). Here, the light ray vector is a unit vector.

$$v=(v_x,v_y,v_z) \quad (1)$$

Since an ON light beam normally exits in the screen optical axis equivalent direction orthogonally to a device surface of the DMD 12, the reflected light ray vector ron during on time can be represented by expression (2) below.

$$ron=(0,0,1) \quad (2)$$

When the reflected light ray vector is represented by expression (2) above, to reduce the thickness (in the Y direction in the drawing) of the entire apparatus, the incident light ray vector preferably has no component in the screen vertical equivalent direction. Accordingly, expression (1) is preferably rewritten to expression (3) below.

$$v=(v_x,0,v_z) \quad (3)$$

On the other hand, the reflected light vector roff when the micromirror is off can be represented as expression (4) below.

$$roff=(roff\_x,roff\_y,roff\_z) \quad (4)$$

When expression (5) below holds at this time, $$roff\_y \neq 0 \quad (5)$$

the reflected light ray vector roff is not present on the plane formed by the screen horizontal equivalent direction and the reflected light ray vector ron.

Similarly, the reflected light ray vector roff is not present on the plane formed by the incident light ray vector and the reflected light ray vector ron.

On the other hand, the incident light ray vector v, the reflected light ray vector ron, and the screen horizontal equivalent direction vector are present on a single plane.

Accordingly, since the reflected light ray vector roff is not present on the plane formed by the screen horizontal equivalent direction and the reflected light ray vector ron, even if the F-number becomes smaller so as to enlarge the aperture in the horizontal direction, the OFF light beam and the ON light beam do not overlap with each other, thereby enabling high luminance. It is possible to provide a thin and high luminance optical unit that achieves high luminance in the screen horizontal direction without increasing the thickness of the optical unit by suppressing an increase in the F-number in the thickness direction (Y direction in the drawing), that is, the aperture diameter equivalent to the opening size of the opening.

When the incident light ray vector and the reflected light ray vectors ron and roff are present on a single plane as in a conventional system, if the F-number in the horizontal direction is reduced, the reflected light ray vector ron overlaps with the reflected light ray vector roff or the a flat light beam, thereby reducing the contrast. To address this situation, the F-number in the vertical equivalent direction needs to be reduced to achieve high luminance. However, this increases the thickness of the optical unit.

As described below, in the present embodiment, the F-number is changed by changing the aperture shape in the horizontal and vertical directions. Specifically, the aperture shape only needs to be changed so as to satisfy the following relational expression.

First, the angle $\theta_{onoff}$ formed by the reflected light ray vectors ron and roff may be represented by expression (6) below. Where $r_{on} \cdot r_{off}$ is the scalar product of vector $r_{on}$ and vector $r_{off}$.

$$\cos \theta_{onoff} = r_{on} \cdot r_{off} = r_{off\_z} \qquad (6)$$

Figure 3:
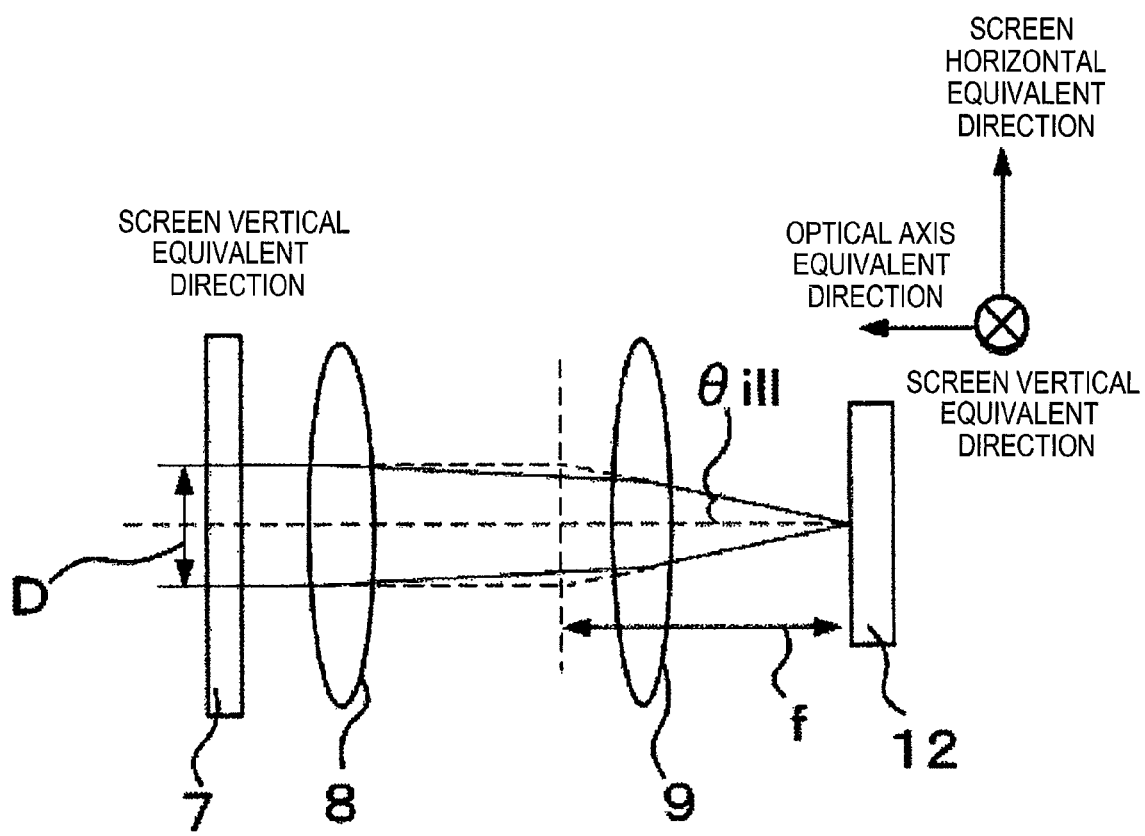
FIG. 3 shows the structure of an illumination optical system in the embodiment and its F-number.

FIG. 3 shows the structure of an illumination optical system in the embodiment and its F-number. The combined focal length of the first relay lens 8 and the second relay lens 9 is assumed to be f. For ease of explanation, the optical path correction prism 10 and the total internal reflection prism 11 are not shown. In addition, the illumination light beam for illuminating the central pixel of the DMD 12 is shown.

When the diameter of the aperture 7 is assumed to be D, the F-number is represented by expression (7).

$$F\text{-number} = f/D \qquad (7)$$

When the converging angle of a light ray of the illumination optical system is assumed to be $\theta$ill, the relation between the F-number and the diaphragm angle is represented by relational expression (8) below.

$$\tan \theta\text{ill} = 1/(2 \times F\text{-number}) \qquad (8)$$

The ON light beam and the OFF light beam also have this F-number. In order to prevent the ON light beam and the OFF light beam from overlapping with each other, angle $\theta$ill multiplied by 2 needs to be smaller than angle $\theta$onoff formed by the ON reflected light ray vector and the OFF reflected light ray vector. Accordingly, angle $\theta$onoff and angle $\theta$ill need to satisfy relational expression (9) below.

$$\cos \theta_{onoff} < \cos 2\theta\text{ill} = ((2 \times F\text{-number})^2 - 1)/((2 \times F\text{-number})^2 + 1) \qquad (9)$$

When the aperture diameter satisfies the relation represented by expression (9), the ON light beam and the OFF light beam do not overlap with each other, thereby achieving the high luminance optical unit without degrading its contrast.

Next, the direction of the aperture diameter that satisfies relational expression (9) will be described.

The aperture diameter does not have to be the same in any direction from the aperture center. The aperture diameter only needs to be determined so that angle $\theta_{onoff}$ on the plane determined by the ON reflected light ray vector ron and the OFF reflected light ray vector roff satisfies relational expression (9) above.

Figure 4:
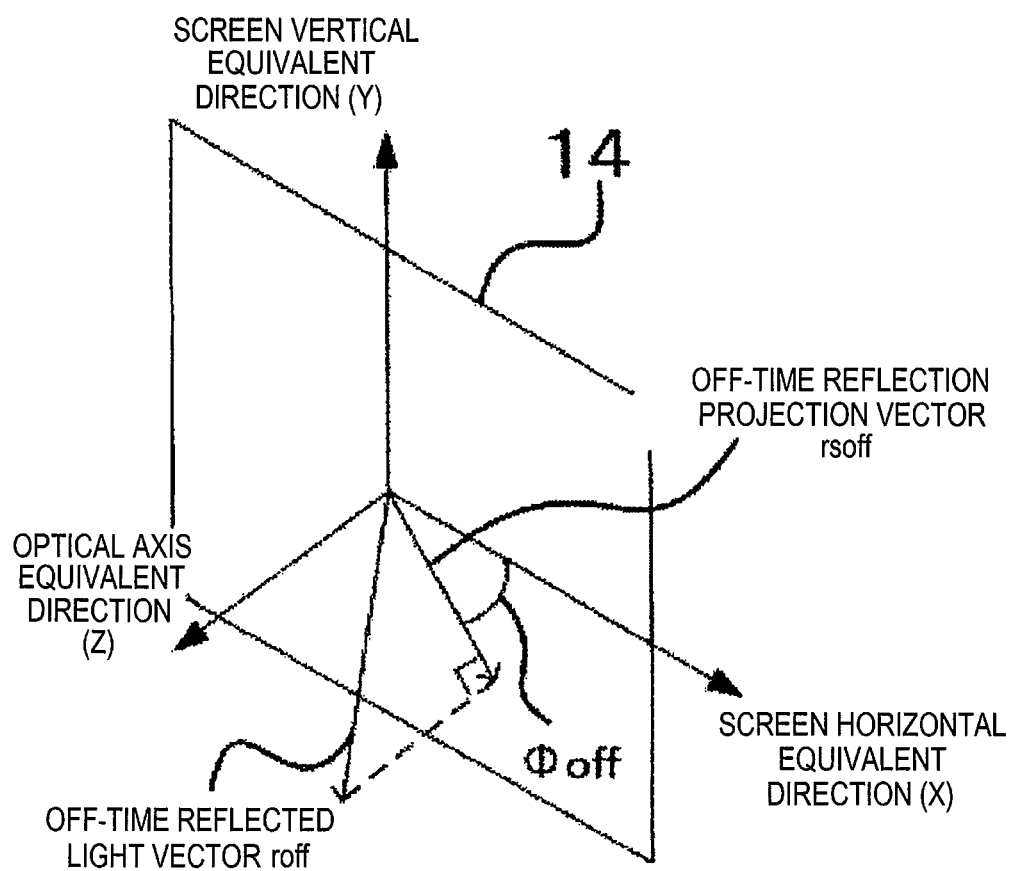
FIG. 4 shows an OFF reflected light ray vector in the embodiment.

FIG. 4 shows an OFF reflected light ray vector roff in the embodiment. Specifically, FIG. 4 shows the OFF reflected light ray vector roff and angle $\phi$off formed by a projection vector rsoff obtained by projecting the OFF reflected light ray vector roff onto the micromirror 14 and the screen horizontal equivalent direction vector. Angle $\phi$off may be represented by expression (10) below.

$$\cos \phi_{off} = r\text{off}\_x \qquad (10)$$

Since the following relation shown in expression (5) holds, $$r\text{off}\_y \neq 0 \qquad (5)$$

the inequality shown as expression (11) is satisfied for angle $\phi$off shown above.

$$\cos \phi_{off} < 1 \qquad (11)$$

Accordingly, the reflected light ray vector roff has a travel component in the screen horizontal equivalent direction.

Figure 5:
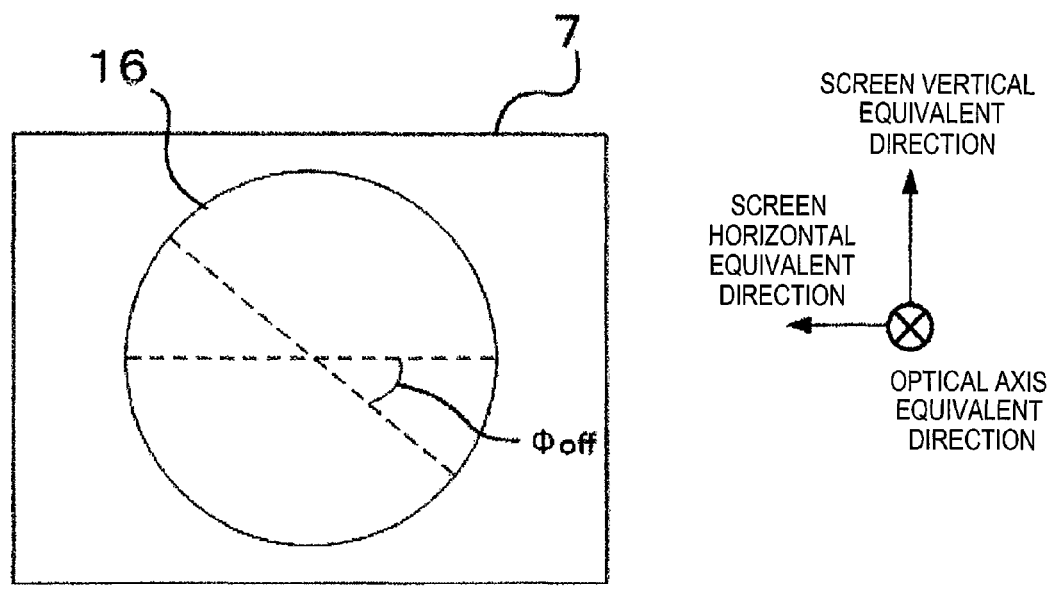
FIG. 5 shows an angle in an aperture and an aperture diameter.

FIG. 5 is a diagram showing an angle in the aperture and the aperture diameter and shows the angle $\phi$ in the aperture and the aperture opening 16. FIG. 5 shows the case in which the aperture opening 16 is a circular as in a conventional aperture.

On the other hand, since angle $\phi$off is a non-zero value in the embodiment, the aperture opening diameter D only needs to satisfy the relation represented by expression (9) in a position displaced from the screen horizontal equivalent direction.

Figure 6:
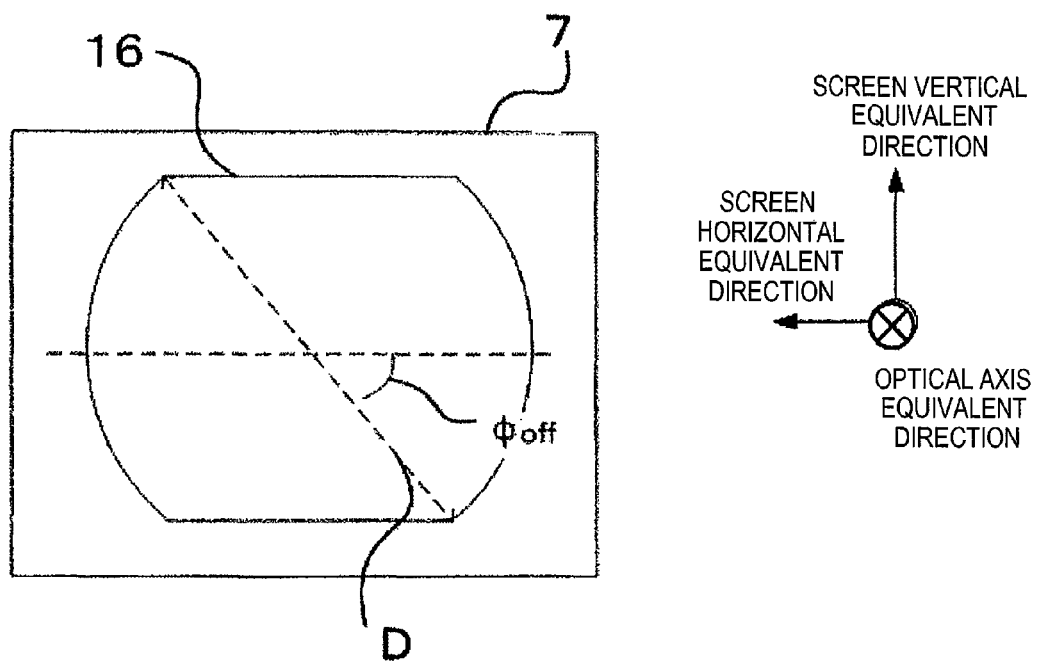
FIG. 6 shows an example of an aperture shape in the embodiment.

FIG. 6 shows an example of the aperture shape in the embodiment. If the aperture diameter satisfies relational expression (9) for the direction of the angle $\phi$ determined by expression (10) and the aperture diameter in the screen horizontal equivalent direction is larger than the aperture opening diameter D, then a thin and high luminance optical unit can be achieved by reducing the F-number without increasing the light beam in the thickness direction and increasing the efficiency using the enlarged opening diameter of the illumination optical system.

Figure 7A:
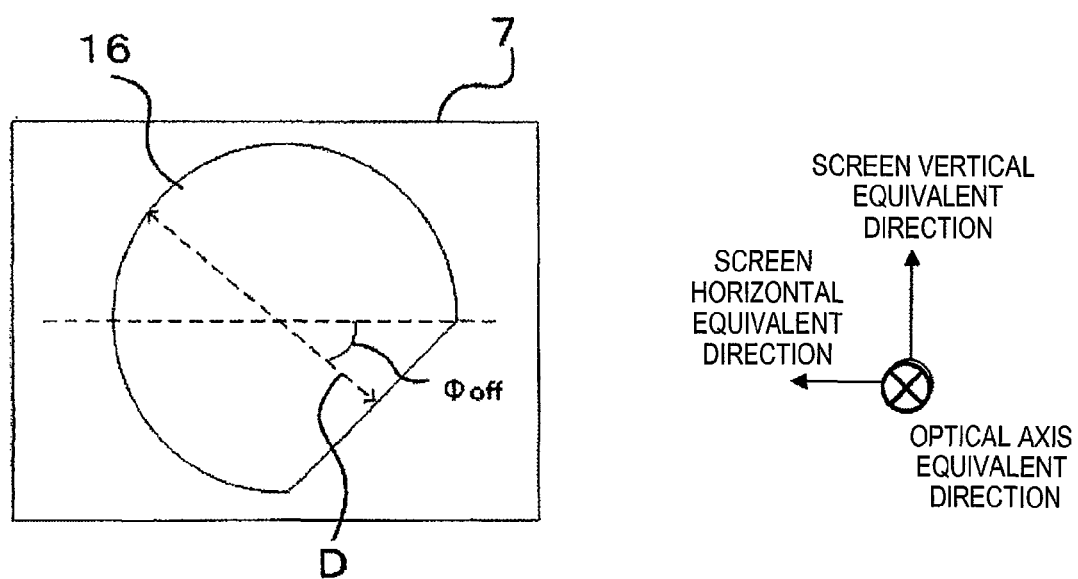
FIG. 7A shows a first modification of the aperture shape in the embodiment.
Figure 7B:
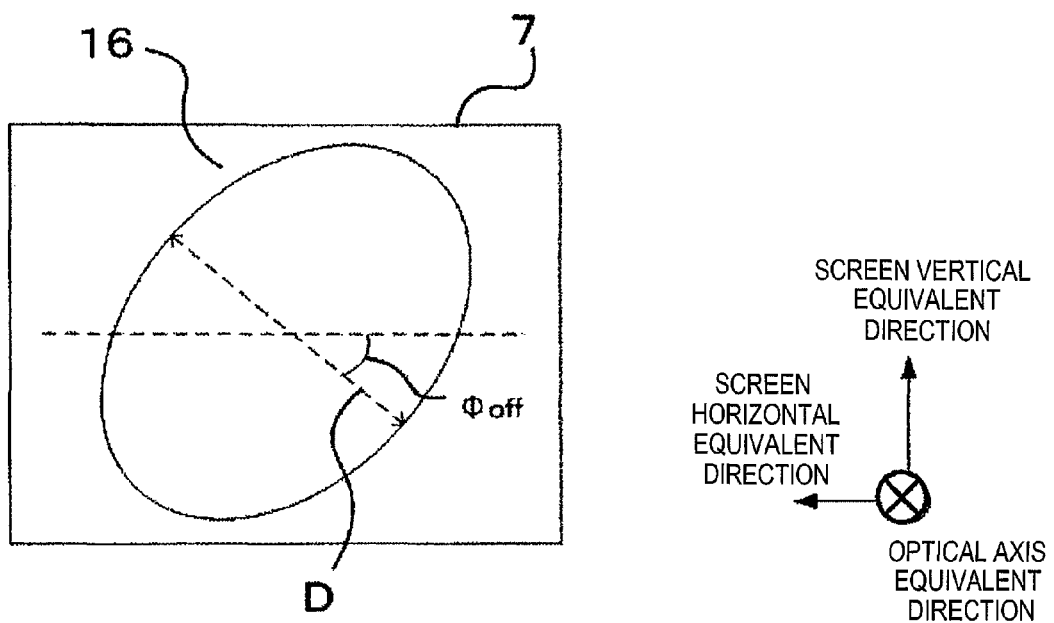
FIG. 7B shows a second modification of the aperture shape in the embodiment.
Figure 7C:
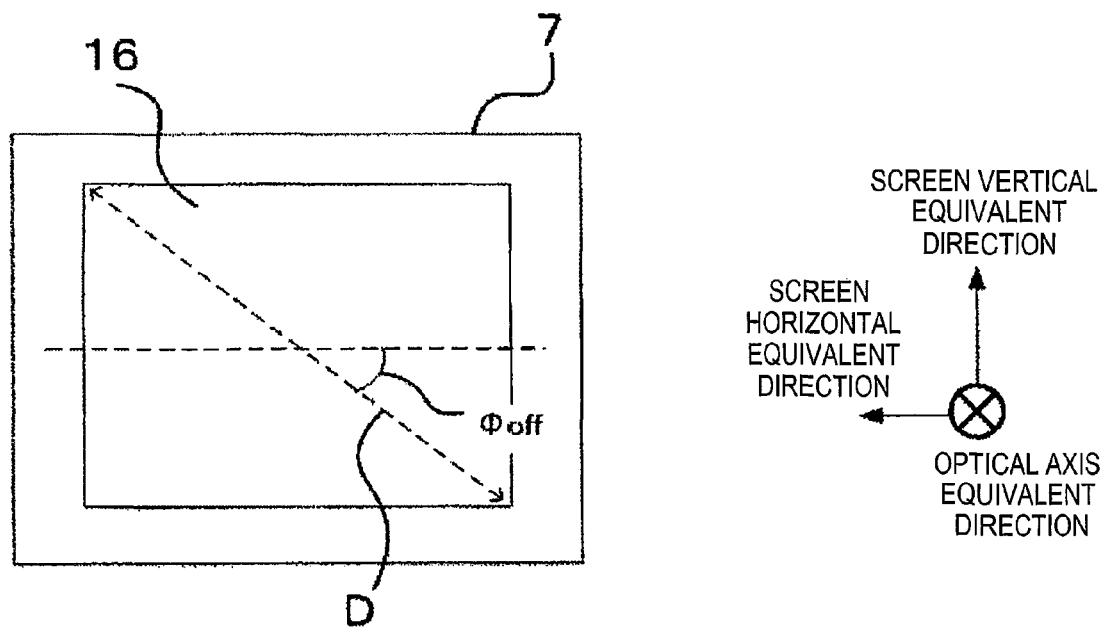
FIG. 7C shows a third modification of the aperture shape in the embodiment.

FIGS. 7A to 7C show first to third modifications of the aperture shape in the embodiment. The drawings show the modifications of the shape of the aperture 14 that satisfies relational expression (9) as in FIG. 6. In either shape, high luminance can be achieved without increasing the thickness of the apparatus by making the opening diameter in the horizontal equivalent direction larger than in the vertical equivalent direction.

As long as the structure satisfies relational expression (9), expression (10), and expression (11), the aperture shape is not limited to those shown in FIG. 6 and FIGS. 7A to 7C, and may be modified freely.

In addition, the aperture does not have to be an independent component. The aperture may be integrated with a cabinet holding the optical system, the shape of the cabinet may be formed into the predetermined aperture shape, and the F-number may be determined.

As described above, if the direction of the light ray reflected by the micromirror and the aperture shape of the illumination optical system as described in the embodiment are configured so as to satisfy the predetermined relational expressions and the aperture diameter in the screen horizontal equivalent direction is made larger than in the screen vertical equivalent direction, a thin, highly efficient, and high luminance optical unit can be achieved.

The values and ranges assumed in the embodiment are only examples and the invention is not limited to the values and ranges.

Although a DMD is used as an example of a picture display device in the embodiment, it will be appreciated that the picture display device is not limited to a DMD. Any picture display device capable of rotating light incident at a certain angle by a predetermined angle and reflecting the rotated light may be used.

Figure 8:
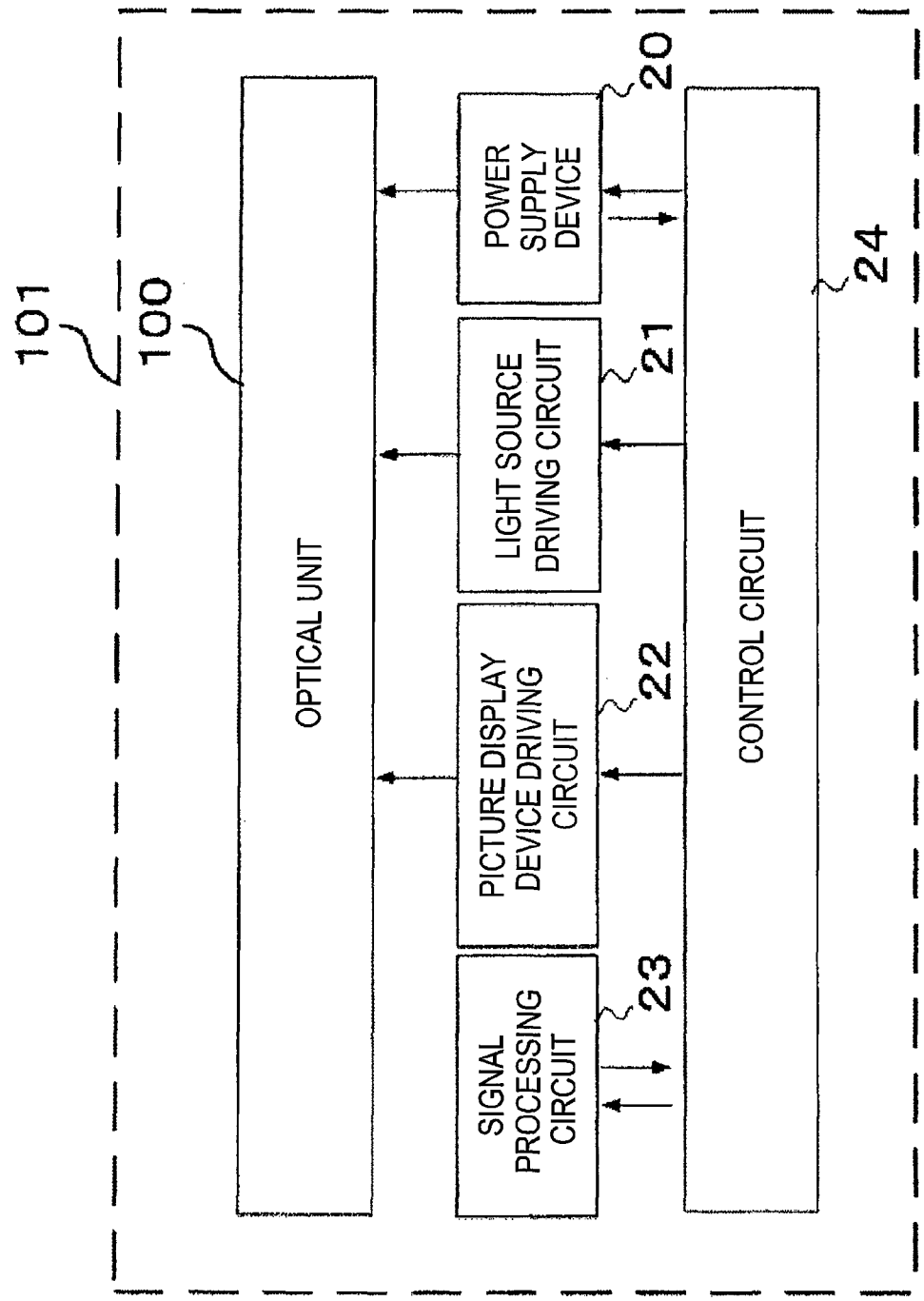
FIG. 8 is a block diagram showing a projection display apparatus in the embodiment.

FIG. 8 is a block diagram showing a projection display apparatus 101 in the embodiment. It is possible to make the projection display apparatus 101 thin and highly luminous by combining, with the optical unit 100 in the embodiment, a power supply device 20, a light source driving circuit 21, a picture display device driving circuit 22, a signal processing circuit 23 for processing picture signals, a control circuit 24, and other units.

Figure 9:
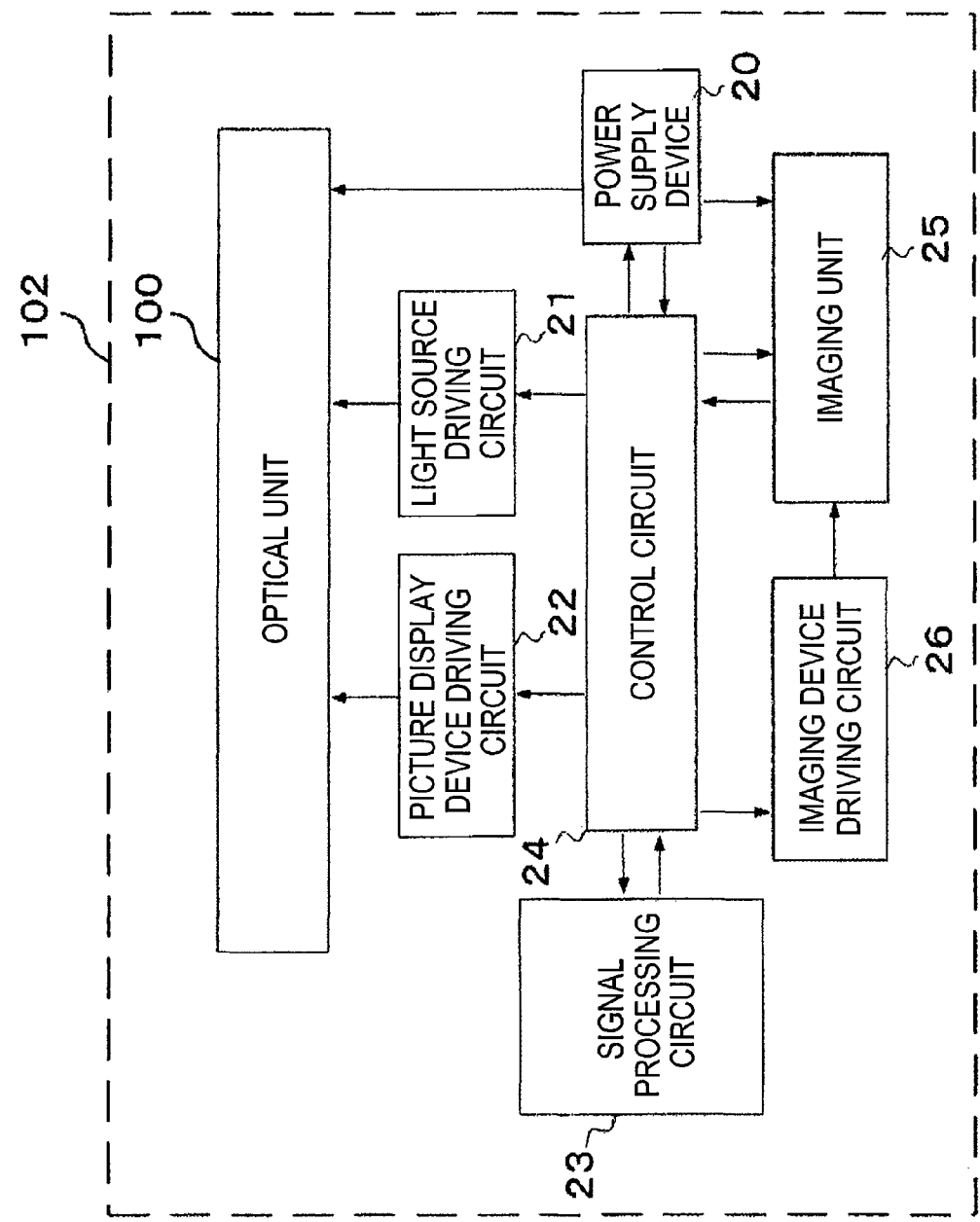
FIG. 9 is a block diagram showing an imaging apparatus incorporating the projection display apparatus in the embodiment.

FIG. 9 is a block diagram showing an imaging apparatus 102 incorporating the projection display apparatus in the embodiment. The imaging apparatus 102 having units such as the power supply device 20, the light source driving circuit 21, the picture display device driving circuit 22, an imaging unit 25 for taking pictures, an imaging device driving circuit 26 for driving an imaging device installed in the imaging unit, the signal processing circuit 23 for processing photography picture signals and display picture signal, and the control circuit 24 combined with the optical unit 100 in the embodiment can be an imaging apparatus including a thin projection display apparatus with high luminance.

The invention is not limited to the above embodiment and includes various modifications. For example, the above embodiment is detailed to describe the invention in an easy-to-understand manner. Accordingly, all components described do not need to be included.

What is claimed is:

1. An optical unit having a reflective picture display device for displaying a picture by projecting light, the optical unit comprising:
    a light source generating the light;
    an illumination lens applying the light emitted from the light source to the picture display device;
    an opening determining an F-number of the illumination lens; and
    a projection optical device displaying a picture by projecting the light reflected by the picture display device,
    wherein the picture display device has a first state in which the applied light is reflected in an optical axis equivalent direction of an image to be displayed and a second state in which the applied light is reflected so as to have a component in a vertical equivalent direction of an image to be projected,
    a plane including an entire optical axis of the applied light reflected by the picture display device in the second state that differs from a plane formed by an optical axis of the light incident on the picture display device and an optical axis of the applied light reflected by the picture display device in the first state, and
    an opening size of the opening in a horizontal equivalent direction of the image to be projected is greater than in the vertical equivalent direction of the image to be projected,
    wherein, when an angle $\theta$onoff is formed by the optical axis of the light reflected by the picture display device in the first state and the optical axis of the light reflected by the picture display device in the second state and an F-number is determined by the opening, the condition cos $\theta$onoff<(2×F-number×F-number−1)/(2×F-number×F-number+1) is satisfied.

2. The optical unit according to claim 1,
    wherein, when an angle $\phi$off is formed by a direction in which the optical axis of the light reflected by the picture display device in the second state is projected onto a plane of the picture display device and the horizontal equivalent direction of the image to be projected, the condition cos $\phi$off<1 is satisfied.

3. The optical unit according to claim 1,
    wherein the opening is disposed in a cabinet of the optical unit and the opening disposed in the cabinet determines the F-number of the illumination lens.

4. The optical unit according to claim 1,
    wherein the light source is an LED light source or a light source obtained by wavelength conversion of light emitted from an LED using a phosphor.

5. The optical unit according to claim 1,
    wherein the picture display device is a micromirror picture display device.

6. A projection display apparatus comprising:
    the optical unit according to claim 1;
    a power supply supplying power to components including the optical unit;
    a light source driving circuit causing the light source to emit light;
    a picture display device driving circuit driving the picture display device in the first state or the second state;
    a signal processing circuit processing a picture signal, generating a signal concerning the image to be displayed, and supplying the generated signal to the picture display device driving circuit; and
    a control circuit controlling operation of the components.

7. An imaging apparatus comprising:
    the projection display apparatus according to claim 6;
    an imaging unit having an imaging device for capturing a picture; and
    an imaging device driving circuit driving the imaging device,
    wherein the signal processing circuit processes a picture signal captured by the imaging unit, generates a signal concerning the image to be displayed, and supplies the generated signal to the picture display device driving circuit.

* * * * *